(12) United States Patent
Bi (10) Patent No.: US 8,847,530 B2
(45) Date of Patent: Sep. 30, 2014

(54) SENSOR-LESS DRIVING METHOD OF PERMANENT MAGNET AC MOTOR

(75) Inventor: Lei Bi, Singapore (SG)

(73) Assignee: Fortior Technology (Shenzhen) Co., Ltd., Shenzhen (CN)

( * ) Notice: Subject to any disclaimer, the term of this patent is extended or adjusted under 35 U.S.C. 154(b) by 155 days.

(21) Appl. No.: 13/643,071

(22) PCT Filed: Apr. 26, 2010

(86) PCT No.: PCT/CN2010/072196
§ 371 (c)(1),
(2), (4) Date: Oct. 23, 2012

(87) PCT Pub. No.: WO2011/130927
PCT Pub. Date: Oct. 27, 2011

(65) Prior Publication Data
US 2013/0038261 A1 Feb. 14, 2013

(30) Foreign Application Priority Data
Apr. 23, 2010 (CN) .......................... 2010 1 01535582

(51) Int. Cl.
H02P 6/18 (2006.01)
H02P 6/10 (2006.01)

(52) U.S. Cl.
CPC . H02P 6/182 (2013.01); H02P 6/10 (2013.01)
USPC ............ 318/400.35; 318/400.34; 318/400.32; 318/400.01; 318/700

(58) Field of Classification Search
CPC ....................................................... H02P 6/182
USPC .................................................... 318/400.35
See application file for complete search history.

(56) References Cited

U.S. PATENT DOCUMENTS 4,651,067 A * 3/1987 Ito et al. .................... 318/400.23
8,264,178 B2 * 9/2012 Kitagawa ................... 318/400.1

* cited by examiner

Primary Examiner — David Luo
(74) Attorney, Agent, or Firm — Alston & Bird LLP (57) ABSTRACT

A permanent-magnet AC motor comprises a motor and a controller coupled to the motor. The motor includes a winding. The controller includes a drive model configured to provide a drive current. Waveform of the drive current is spatially symmetrical. The winding has a waiting zone having electrical angle of 30° and a driving zone having electrical angle of 150° in each half electrical cycle when the motor is in operation. The driving zone is equally divided into five driving sub-zones.

4 Claims, 7 Drawing Sheets

SENSOR-LESS DRIVING METHOD OF PERMANENT MAGNET AC MOTOR

TECHNICAL FIELD

The present invention relates to a motor drive method, more particularly to a sensorless drive method for a permanent-magnet alternating current motor.

BACKGROUND

Permanent-magnet alternating current (PMAC) motors have become popular in many applications due to its high efficiency and power density. Although PMAC drive system with employment of rotor position sensor(s) may be easily implemented, the rotor position sensor(s) may increase cost of the drive system. Furthermore, the rotor position sensor(s) may occupy space in the motor thus making it hard to fit in a compact motor.

Many PMAC motors, especially compact motors, have sinusoidal back-electromotive force (EMF) when they are running smoothly. These PMAC motors may be driven by sinusoidal current in time domain to reduce torque ripple and improve motor efficiency. However, it may be hard to achieve sinusoidal current in a sensorless drive system. Brushless direct current motor (BLDC) drive is widely used due to its simplicity and high reliability. But electromagnetic torque ripple in BLDC motor may cause acoustic noise and vibration when in motor operation. In addition, current commutation may induce sudden jumps in current waveform, thus causing additional noise. In many applications, fluid dynamic bearings may be used to reduce noise generated by vibration. However, with the use of fluid dynamic bearings motor may be more sensitive to noise generated by electromagnetic toque and current commutation.

BRIEF SUMMARY

According to one exemplary embodiment of the present invention, a permanent-magnet AC motor comprises a motor and a controller coupled to the motor. The motor includes a winding. The controller includes a drive model configured to provide a drive current. Waveform of the drive current is spatially symmetrical. The winding has a waiting zone having electrical angle of 30° and a driving zone having electrical angle of 150° in each half electrical cycle when the motor is in operation. The driving zone is equally divided into five driving sub-zones.

According to one exemplary embodiment of the present invention, a sensorless AC drive method for driving a permanent-magnet AC motor comprises determining rotor positions at 0°, 120° and 240° by detecting rising edge of a ZCP signal, determining rotor positions at 60°, 180° and 300° by detecting falling edge of a ZCP signal, determining rotor positions at 15°, 45°, 75°, 105°, 135°, 165°, 195°, 225°, 255°, 285°, 315° and 345° to determine space points of each driving sub-zone, calculating a time interval between a pair of adjacent ZCPs, assigning ¼ time interval to 15° space interval, determining rotor positions according to the time interval.

BRIEF DESCRIPTION OF THE DRAWING(S)

Having thus described the example embodiments of the present invention in general terms, reference will now be made to the accompanying drawings, which are not necessarily drawn to scale, and wherein:

DETAILED DESCRIPTION

The present disclosure now will be described more fully with reference to the accompanying drawings, in which some, but not all embodiments of the disclosure are shown. This disclosure may be embodied in many different forms and should not be construed as limited to the embodiments set forth; rather, these example embodiments are provided so that this disclosure will be thorough and complete, and will fully convey the scope of the disclosure to those skilled in the art. Like numbers refer to like elements throughout.

When a motor is driven by a conventional BLDC motor, in each duty cycle, two zones that each has 120° electrical angle have conducting current are defined as driving zone. Two zones that each has 60° electrical angle do not have conducting current are defined as waiting zone. By use of BLDC motor, back-EMF can be detected at high speed because the waiting zone does not conduct current. By detecting the zero crossing points (ZCPs) of back-EMF, the rotor position, commutation timing and current direction can be determined which may eliminate the use of position sensors. As described in FIG. 1, each ZCP is associated with one rotor position. As such, ZCP can be determined by detecting terminal voltage of PMAC motor at rotor positions, namely, 0°, 60°, 120°, 180°, 240° or 300°. Using the method described above, sensorless BLDC drive model can be achieved.

Figure 2:
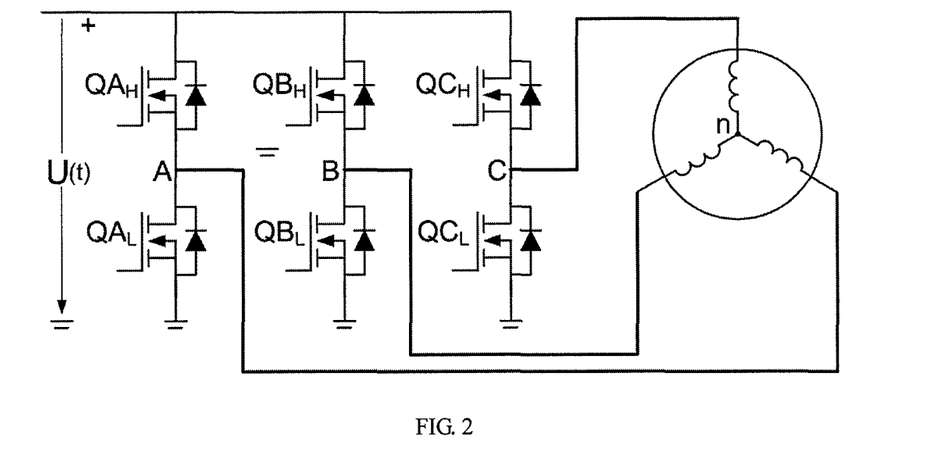
FIG. 2 is a circuit diagram of a three-phase bridge of a PMAC motor.

FIG. 2 shows a three-phase bridge circuit of a PMAC drive model. The three-phase bridge circuit shown in FIG. 2 comprises six power semiconductor devices and corresponding protective diodes. When rotor positions are determined, control circuit of the drive model sends a switch signal to control terminal of each power semiconductor device so as to yield desired drive current in driving zones.

When drive model shown in FIG. 2 is employed, in each half cycle wave, each triode has a conducting zone with a 120° conduction angle. Each conducting zone is corresponding to a driving zone of armature winding. Interval between the two conducting zones of the triodes is corresponding to the waiting zone of the armature winding and is defined as silent zone with a 60° non-conduction angle. For example, in phase A, $Q_{AH}$ is conducted between 30° and 150° while $Q_{AL}$ is conducted between 210° and 330°. The silent zones of each triode are between 330° and 30°, and between 150° and 210°. If the back-EMF of the PMAC motor is sinusoidal, when motor's phase current meets equation (1) and transient process in commutation is ignored, the motor's torque ripple may be minimized.

$$i_a(\theta) = \begin{cases} 0 & \theta \leq \frac{\pi}{6}; \frac{5\pi}{6} \leq \theta < \frac{7\pi}{6}; \theta \geq \frac{11\pi}{6} \\ [U - \sqrt{3}\, E_m \cos(\theta - \frac{\pi}{3})]/R & \frac{\pi}{6} \leq \theta < \frac{\pi}{2}; \frac{7\pi}{6} \leq \theta < \frac{9\pi}{6} \\ [U - \sqrt{3}\, E_m \cos(\theta - \frac{2\pi}{3})]/R & \frac{\pi}{2} \leq \theta < \frac{5\pi}{6}; \frac{9\pi}{6} \leq \theta < \frac{11\pi}{6} \end{cases} \quad (1)$$

$$i_b(\theta) = i_a\left(\theta - \frac{2\pi}{3}\right)$$

$$i_c(\theta) = i_a\left(\theta - \frac{4\pi}{3}\right)$$

In equation (1), $E_m$ is the amplitude of the back-EMF for each phase. R refers to phase resistance of the armature winding. U refers to DC voltage.

Figure 3:
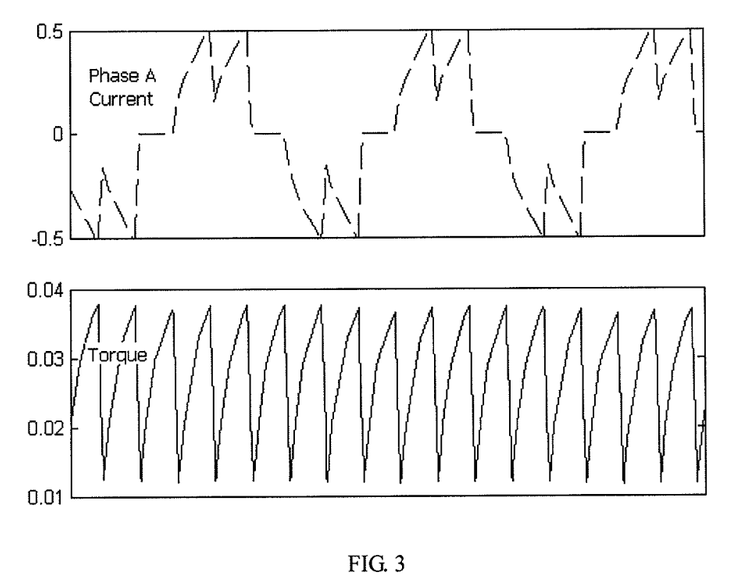
FIG. 3 is a diagram showing current and electromagnetic torque of a PMAC motor with sinusoidal back-EMF using a conventional BLDC drive model.

If the transient process in commutation is not ignored, the BLDC drive model may induce distinct torque ripple. FIG. 3 shows a current and electromagnetic torque of a PMAC motor using BLDC drive model. As shown in FIG. 3, the torque ripple generates noise and vibration in motor operation.

Figure 4:
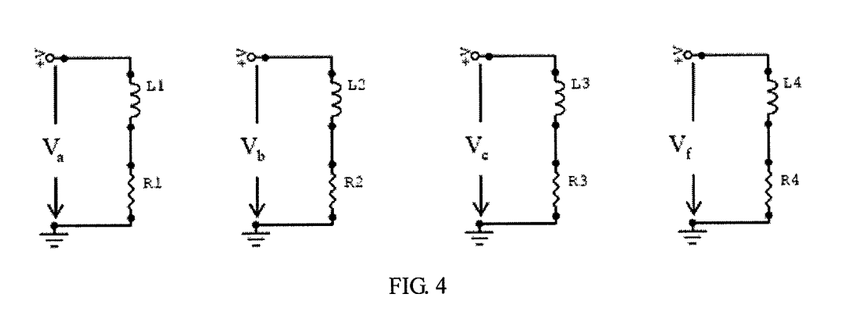
FIG. 4 is a diagram showing ABC circuit model of a PMAC motor in accordance with an exemplary embodiment of the present invention.

When nonlinearity of magnetic circuit is not considered, an ABC circuit module can be used to describe operation of a three-phase PMAC motor. In this module, the circuit comprises four windings. The magnetic field generated by a rotor is represented by excitation winding f, as shown in FIG. 4. Exciting current through the excitation winding f may be constant.

When ABC circuit module is employed, electromagnetic torque of a PMAC motor can be represented by equation (2):

$$T_m = \frac{p}{2}\left[\begin{array}{l} \frac{1}{2}\left(i_f^2 \frac{dL_f}{d\theta}\right) + \frac{1}{2}\left(i_a^2 \frac{dL_a}{d\theta} + i_b^2 \frac{dL_b}{d\theta} + i_c^2 \frac{dL_c}{d\theta}\right) + \\ i_a i_b \frac{dM_{ab}}{d\theta} + i_b i_c \frac{dM_{bc}}{d\theta} + i_c i_a \frac{dM_{ca}}{d\theta} + i_a i_f \frac{dM_{af}}{d\theta} + i_b i_f \frac{dM_{bf}}{d\theta} + i_c i_f \frac{dM_{cf}}{d\theta} \end{array}\right] \quad (2)$$

In equation (2), $L_a$, $L_b$ and $L_c$ are self-inductance of windings A, B and C. $M_{ab}$, $M_{bc}$ and $M_{ca}$ are mutual inductance of windings A, B and C. $L_f$ is the self-inductance of the excitation winding while $M_{af}$, $M_{bf}$ and $M_{cf}$ are mutual inductance between the excitation winding and the armature windings A, B and C respectively.

Rotors of some small-sized PMAC motors may use surface mounted magnet structure. For this kind of motor, self-inductance and mutual inductance may be irrelevant to rotor positions. However, mutual inductance may vary sinusoidal with rotor position. It follows that the electromagnetic torque shown in equation (2) can be simplified as:

$$T_m = T_a + T_b + T_c \quad (3)$$

where,

-continued $$(T_a, T_b, T_c) = \frac{p}{2} i_f \left(i_a \frac{dM_{af}}{d\theta}, i_b \frac{dM_{bf}}{d\theta}, i_c \frac{dM_{cf}}{d\theta}\right) \quad (4)$$

and $$\begin{cases} e_a(\theta) = i_f \frac{dM_{af}}{d\theta} = E_m \sin\theta \\ e_b(\theta) = i_f \frac{dM_{bf}}{d\theta} = E_m \sin\left(\theta - \frac{2\pi}{3}\right) \\ e_c(\theta) = i_f \frac{dM_{cf}}{d\theta} = E_m \sin\left(\theta - \frac{4\pi}{3}\right) \end{cases} \quad (5)$$

In other words, the back-EMF induced by the three-phase winding is sinusoidal when armature winding current meets equation (6), $$\begin{cases} i_a = I_m \sin(\theta) \\ i_b = I_m \sin\left(\theta - \frac{2\pi}{3}\right) \\ i_c = I_m \sin\left(\theta - \frac{4\pi}{3}\right). \end{cases} \quad (6)$$

Figure 1:
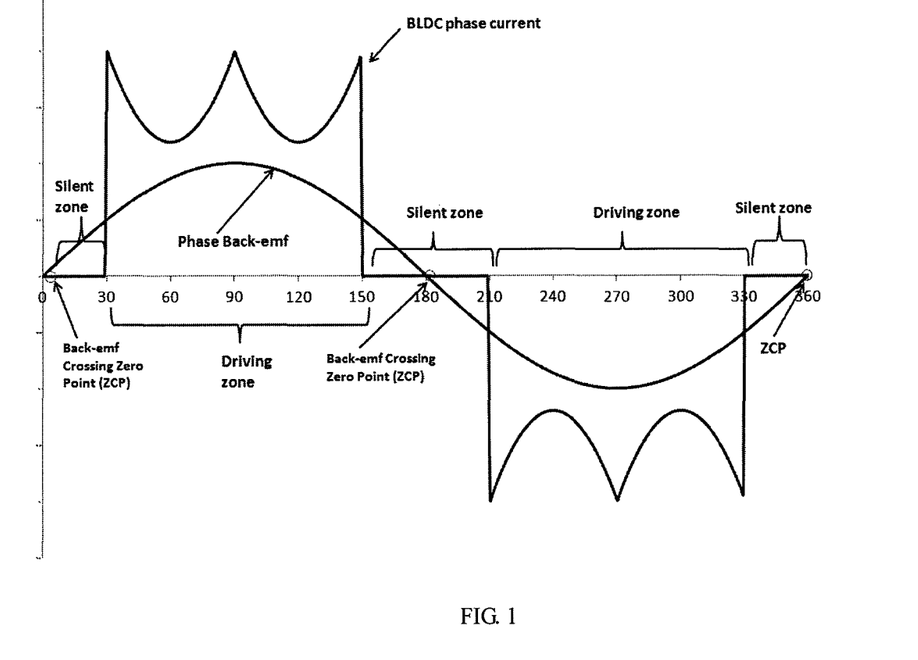
FIG. 1 is a schematic diagram showing driving zone and waiting zone using a conventional BLDC drive model.

EM torque generated by the motor is constant at any position. As a result, torque ripple may be reduced or eliminated in motor operation. However, each winding carries current throughout the entire operation except some particular positions. As such, there is no waiting zone as shown in FIG. 1 which may increase difficulty to determine the rotor positions in PMAC without using sensors.

To achieve high performance drive without using sensors, back-EMF $e_a(\theta)$ of phase A winding is indicated by equation (7):

$$e_a(\theta) = E_m \sin(\theta). \quad (7)$$

Figure 5:
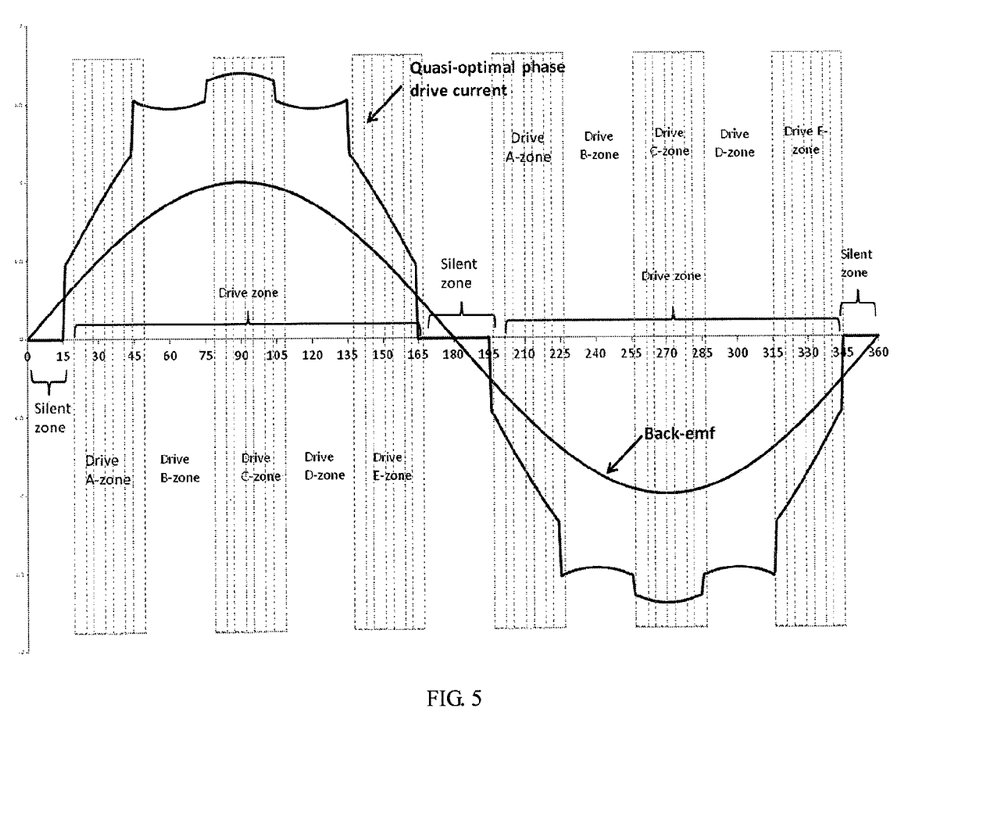
FIG. 5 is a schematic diagram showing a quasi-optimized current in accordance with an exemplary embodiment of the present invention.

In operation, when drive module generates three-phase drive current ($i_a$, $i_b$, $i_c$) through windings A, B and C as indicated by equation (8), spatial waveform of the three-phase current is spatially symmetrical, as shown in FIG. 5. Three-phase drive current may have a waiting zone with 30° electrical angle and a driving zone with 150° electrical angle in each half duty cycle. As a result, the electrical angle of each waiting zone is smaller than that of the conventional BLDC (namely, 60°) while the electrical angle of the driving zone is larger than that of the conventional BLDC (namely, 120°). Three-phase drive current indicated by equation (8) is referred as quasi-optimized current. Driving zone of the quasi-optimized current comprises five driving sub-zones A, B, C, D and E.

Figure 6:
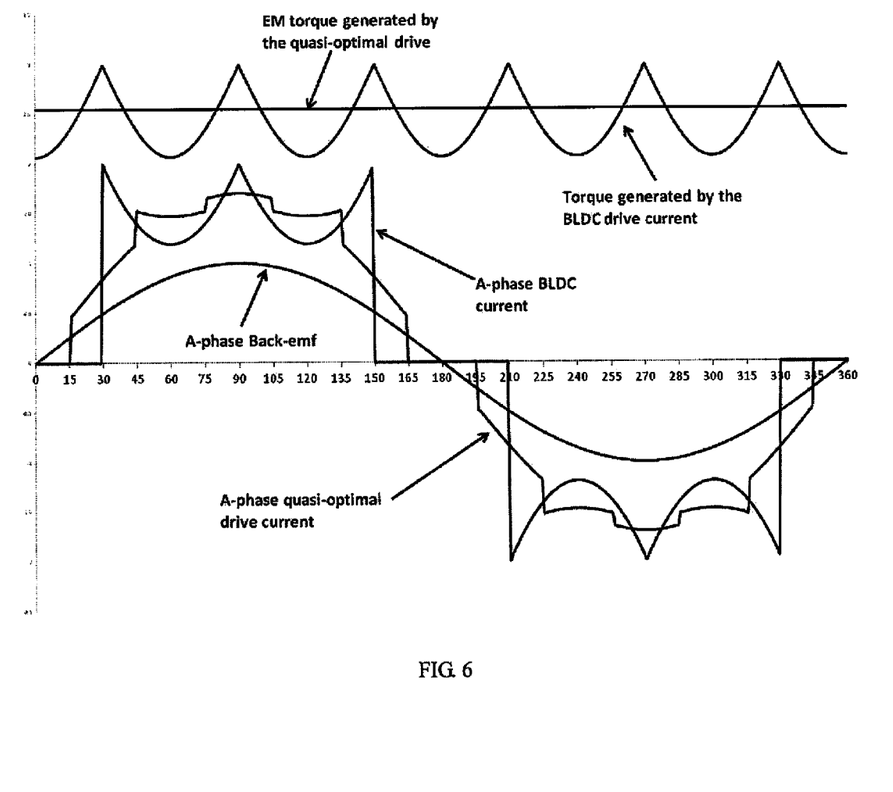
FIG. 6 is a diagram comparing the exemplary quasi-optimized current illustrated in FIG. 5 to current generated in conventional BLDC.

Quasi-optimized current indicated by equation (8) and shown in FIG. 5 may generate electromagnetic torque waveform as shown in FIG. 6 and may generate constant electromagnetic torque. Average value of the electromagnetic torque may be increased due to a larger driving zone than that of the conventional BLDC motor. Efficiency and power density may also be improved. Since rotor positions can be accurately detected, sensorless drive can be achieved.

In operation, when space points of every sub-zone (namely rotor positions at 15°, 45°, 75°, 105°, 135°, 165°, 195°, 225°, 255°, 285°, 315° and 345°) are determined, quasi-optimized current can be achieved. Rotor positions can be determined by the following method:

a. Rotor positions at 0°, 120° and 240° can be determined by detecting rising edge of ZCP signal. Rotor positions at 60°, 180° and 300° can be determined by detecting falling edge of ZCP signal.

b. Time interval $t_z$ between a pair of adjacent ZCPs may be calculated by a clock signal and recorded in a memory. $t_z/4$ time interval may indicate 15° space distance. Similarly, $3t_z/4$ time interval may indicate 45° space distance. For example, when falling edge or rising edge of a ZCP signal is detected at 60°, time interval from 0° to 60° may be calculated and defined as $t_z$. After an additional $t_z/4$ interval, the rotor position is determined at 75°. If it is after additional $3t_z/4$ time, rotor position is determined at 105°. In this way, we can accurately obtain time intervals of each driving sub-zone.

c. In each driving sub-zone, equation (8) is used to derive winding current. Winding current may be generated by amplifier circuit of linear amplifier or PWM.

FIG. 6 is a diagram comparing the exemplary quasi-optimized current illustrated in FIG. 5 to current generated in conventional BLDC. As shown in FIG. 6, current jump of quasi-optimized current is smaller than that of BLDC current. Since current jump generated in current commutation may be a source of acoustic noise, reduction of current jump can also reduce motor noise. Therefore, using quasi-optimized current can reduce noises caused by the drive current.

$$i_a = \begin{cases} 0, & \frac{(-1+12k)\pi}{12} < \theta \le \frac{(1+12k)\pi}{12} & (k=0,1) \\ I_m \sin(\theta), & \frac{(1+4k)\pi}{12} \le \theta < \frac{(3+4k)\pi}{12} & (k=0,1,2) \\ \frac{\sqrt{3}}{2} I_m \sec\left(\theta - \frac{\pi}{3} + k\pi\right), & \frac{(3+12k)\pi}{12} \le \theta < \frac{(5+12k)\pi}{12} & (k=0,1) \\ \frac{\sqrt{3}}{2} I_m \sec\left(\theta - \frac{2\pi}{3} + k\pi\right), & \frac{(7+12k)\pi}{12} \le \theta < \frac{(9+12k)\pi}{12} & (k=0,1) \\ -I_m \sin(\theta), & \frac{(13+4k)\pi}{12} \le \theta < \frac{(15+4k)\pi}{12} & (k=0,1,2) \end{cases} \quad (8)$$

$$i_b = i_a\left(\theta - \frac{2\pi}{3}\right)$$

$$i_b = i_a\left(\theta - \frac{4\pi}{3}\right)$$

Figure 7:
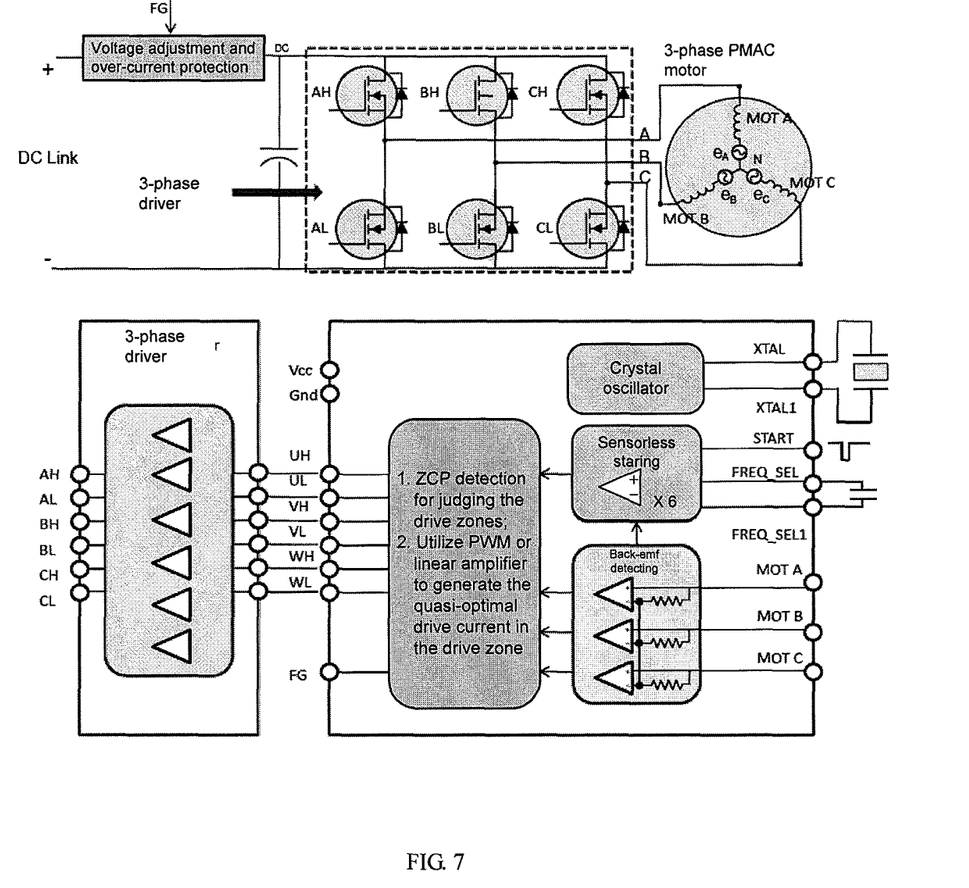
FIG. 7 is a schematic diagram of a controller in accordance with an exemplary embodiment of the present invention using drive model illustrated in FIG. 5.

FIG. 7 shows a controller using the exemplary drive model illustrated in FIG. 5 according to an embodiment. In order to determine driving sub-zones and quasi-optimized current, a signal processor may be employed.

The quasi-optimized current may be derived from equation (8). It may be generated by PWM or linear amplifier. Torque ripple factor $T_{RF}$ is defined as follows:

$$T_{RF} = \frac{T_{peak} - T_{av}}{T_{av}}\% \qquad (9)$$

Figure 8:
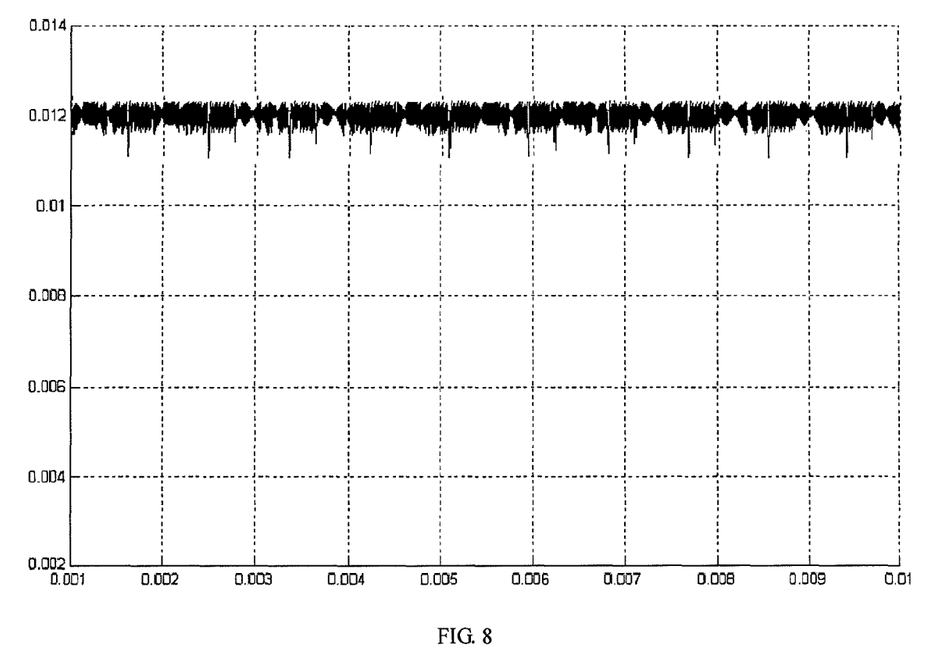
FIG. 8 is a schematic diagram showing electromagnetic torque of a PMAC motor when PWM is used to generate quasi-optimized current illustrated in FIG. 5 in accordance with an exemplary embodiment of the present invention.

In one embodiment that linear amplifier is used to generate the quasi-optimized current, $T_{RF}$ of the quasi-optimized current is zero. In contrast, $T_{RF}$ of BLDC motor is about 13.9%, as shown in FIG. 8.

Figure 9:
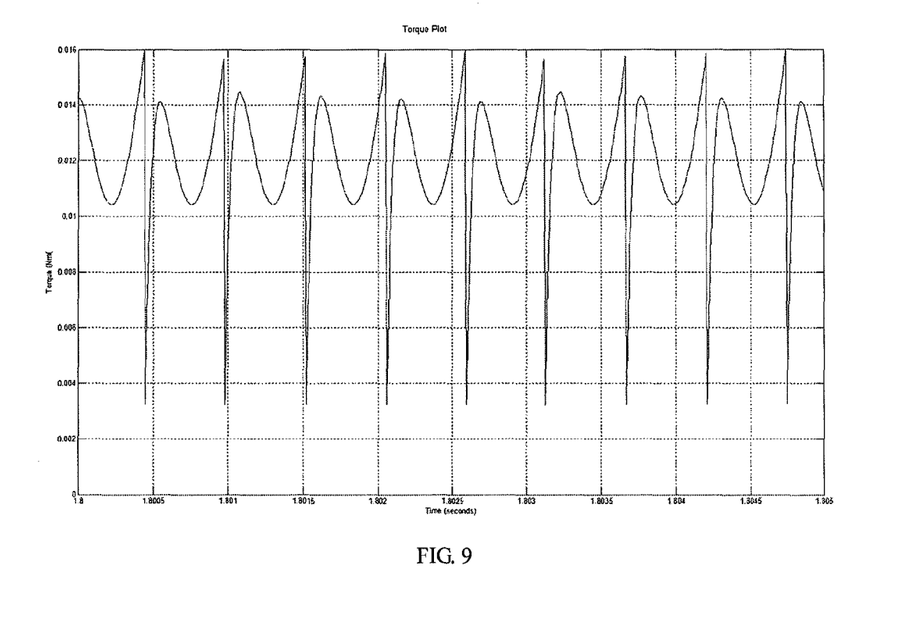
FIG. 9 is a schematic diagram showing the electromagnetic torque of a PMAC motor when PWM is used to generate BLDC current.

In another embodiment that PWM is used to generate the quasi-optimized current, $T_{RF}$ is about 2%. In contrast, $T_{RF}$ of BLDC motor is about 70%, as shown in FIG. 9.

Figure 10:
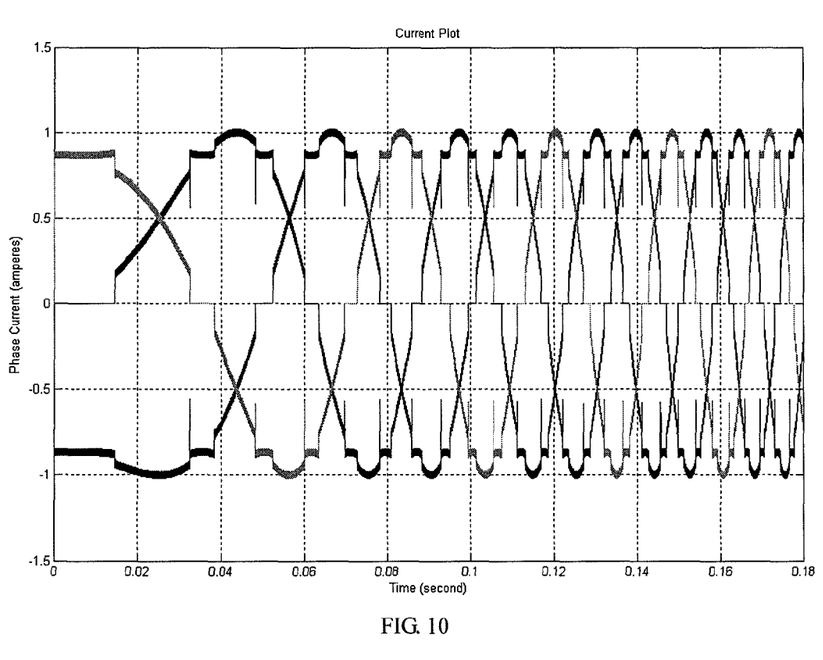
FIG. 10 is a schematic diagram showing a three-phase quasi-optimized current when PMAC motor is in operation in accordance with an exemplary embodiment of the present invention.

FIG. 10 is a schematic diagram showing a three-phase quasi-optimized current when PMAC motor is in operation in accordance with an exemplary embodiment of the present invention. Waiting zone of each winding and positions of ZCPs can be used to detect rotor positions without employing sensors. Because the drive model described above in accordance with exemplary embodiments can reduce current jump in current commutation, the motor noise and vibration can be reduced. Compared with the conventional BLDC, the exemplary drive model reduces the signal phase of waiting zone from 60° to 30° thus improving motor efficiency and power density.

The drive model in accordance with exemplary embodiments can be implemented in any PMAC motors using any starting method, such as variable frequency starting, inductance detection starting method or any other suitable starting methods. The waveform of the three-phase current derived from equation (8) may vary depending on coefficients of equation (8).

Many modifications and other example embodiments set forth herein will come to mind to one skilled in the art to which these example embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

The invention claimed is:

1. A permanent-magnet AC motor, comprising:
    a motor, including a winding; and
    a controller coupled to the motor, the controller including a drive model configured to provide a drive current, wherein waveform of the drive current is spatially symmetrical, the winding has a waiting zone having electrical angle of 30° and a driving zone having electrical angle of 150° in each half electrical cycle when the motor is in operation, and wherein the driving zone is equally divided into five driving sub-zones.

2. A sensorless drive method for driving a permanent-magnet AC motor, comprising:
    determining rotor positions at 0°, 120° and 240° by detecting rising edge of a ZCP signal,
    determining rotor positions at 60°, 180° and 300° by detecting falling edge of a ZCP signal;
    determining rotor positions at 15°, 45°, 75°, 105°, 135°, 165°, 195°, 225°, 255°, 285°, 315° and 345° to determine space points of each driving sub-zone;
    calculating a time interval between a pair of adjacent ZCPs;
    assigning ¼ time interval to 15° space interval; and
    determining rotor positions according to the time interval.

3. The sensorless AC drive method of claim 2, wherein the quasi-optimized current is derived from:

$$i_a = \begin{cases} 0, & \frac{(-1+12k)\pi}{12} < \theta \leq \frac{(1+12k)\pi}{12} & (k=0,1) \\ I_m \sin(\theta), & \frac{(1+4k)\pi}{12} \leq \theta < \frac{(3+4k)\pi}{12} & (k=0,1,2) \\ \frac{\sqrt{3}}{2} I_m \sec\left(\theta - \frac{\pi}{3} + k\pi\right), & \frac{(3+12k)\pi}{12} \leq \theta < \frac{(5+12k)\pi}{12} & (k=0,1) \\ \frac{\sqrt{3}}{2} I_m \sec\left(\theta - \frac{2\pi}{3} + k\pi\right), & \frac{(7+12k)\pi}{12} \leq \theta < \frac{(9+12k)\pi}{12} & (k=0,1) \\ -I_m \sin(\theta), & \frac{(13+4k)\pi}{12} \leq \theta < \frac{(15+4k)\pi}{12} & (k=0,1,2) \end{cases}$$

$$i_b = i_a\left(\theta - \frac{2\pi}{3}\right)$$

$$i_b = i_a\left(\theta - \frac{4\pi}{3}\right).$$

4. The sensorless AC drive method of claim 3, further comprising generating the quasi-optimized current by one of linear amplifier and pulse-width modulation (PWM).

* * * * *

UNITED STATES PATENT AND TRADEMARK OFFICE
CERTIFICATE OF CORRECTION

PATENT NO. : 8,847,530 B2  
APPLICATION NO. : 13/643071  
DATED : September 30, 2014  
INVENTOR(S) : Lei Bi Page 1 of 1

It is certified that error appears in the above-identified patent and that said Letters Patent is hereby corrected as shown below:

Title page,

"(30)          Foreign Application Priority Data

Apr. 23, 2010      (CN)............................. 2010 1 01535582"

should read

--(30)          Foreign Application Priority Data

Apr. 23, 2010      (CN)............................. 2010 1 01535582.9--

Signed and Sealed this  
Seventeenth Day of February, 2015

Michelle K. Lee  
*Deputy Director of the United States Patent and Trademark Office*